Feb. 11, 1969          J. ZEKE          3,427,429
WELDING APPARATUS
Filed Oct. 22, 1965
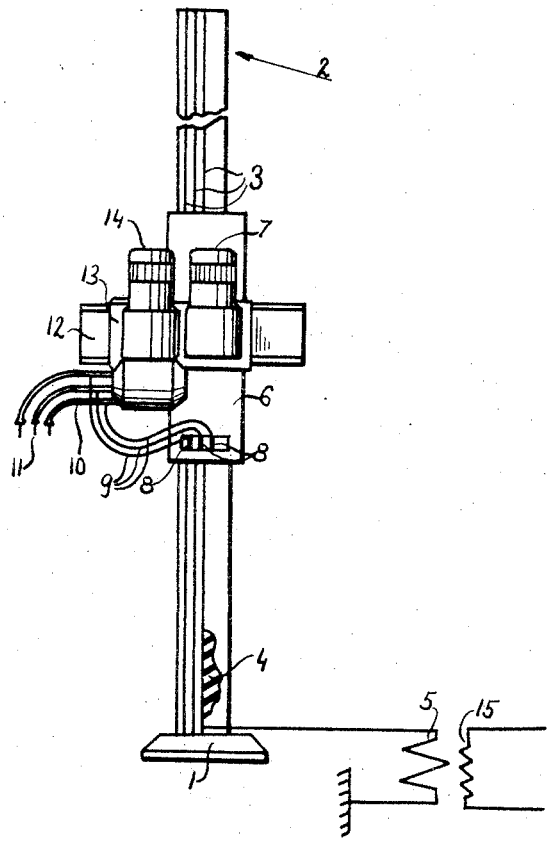

3,427,429
WELDING APPARATUS
Julius Zeke, Bratislava, Czechoslovakia, assignor to Vyskumny Ustav Zvaracsky, Bratislava, Czechoslovakia
Filed Oct. 22, 1965, Ser. No. 502,653
U.S. Cl. 219—126  11 Claims
Int. Cl. B23k 9/12, 9/28, 11/10

ABSTRACT OF THE DISCLOSURE

In an electrical welding apparatus a vertical column carries a plurality of bus-bar conductors extending lengthwise thereof. A carriage is mounted for movement along the column. A source of electrical energy is connected with the bus-bars. Second conductors are mounted on the carriage and are in permanent current-conducting engagement with the bus-bars via current takeoffs so that current will be transmitted between the bus-bars and the second conductors in any position of the carriage. A plurality of electrodes are supported by the carriage and each receives electrical energy through one of the bus-bars and one of the second conductors.

---

The present invention relates to welding apparatus. More specifically, the present invention relates to an electrical welding apparatus. Still more specifically, the invention relates to an arrangement which finds use in electrical welding apparatus and has been found of particular value in electrical welding apparatus for electroslag welding.

In the electrical welding of large articles, particularly of articles having substantially vertical faces, two main types of automatic devices for welding purposes are known. Both of these types relate to electroslag welding and one of them moves directly along the members to be welded, whereas the other is arranged remote from the members to be welded and moves along its own guide means which permit it to follow the contour of the members to be welded. The invention relates to the latter type of device, and according to the teaching of the prior art such devices usually comprise a substantially vertical and immovable column, and a movable member, such as the actual welding apparatus, which moves along this column in vertical direction.

The movable welding apparatus in slag-welding applications is generally provided with three nozzles which guide the welding electrodes. Each of the three nozzles is connected via two conductors with the secondary winding of a welding transformer. The same number of conductors is also connected to the members to be welded. However, in devices for electroslag welding the conductors must carry a welding current of 800–1000 amperes, and must be correspondingly dimensioned. As an example, and assuming that the conductors are made of copper, they may each have a cross-sectional area of 120 mm.² and the length of each conductor will generally be on the order of 10 meters and more. Now it is known from prior art structures to connect these very heavy and cumbersome conductors directly to the movable part of the welding device, that is to the actual welding apparatus. Naturally, whenever the welding apparatus will move along its stationary support, it must drag these conductors behind it. This makes it difficult to manipulate the welding apparatus, and it makes it difficult to manipulate the conductors which, as mentioned, often must exceed 10 meters in length to permit welding of long seams; and it furthermore requires the provision of considerably over-dimensioned motors for moving the welding apparatus, particularly in upward direction along its stationary support.

It is therefore a general object of the present invention to provide a welding apparatus which overcomes the above-mentioned disadvantages.

A more specific object of the present invention is to provide a welding apparatus of the type described in which the length of the required conductors can be substantially reduced.

Yet a more specific object of the invention is to provide a welding apparatus of the above type in which the actual welding machine, that is the movable carriage, is not required to drag welding cables along during its movements.

In accordance with one feature of the invention I provide, in an electrical welding apparatus, an elongated guide means, a carriage means which is mounted for movement along the guide means, first conductor means which extends lengthwise of the guide means, a source of electrical energy which is connected to the first conductor means, and a second conductor means mounted on the carriage means and in permanent current-conducting engagement with the first conductor means so that a current will be transmitted between the conductor means in any position of the carriage means. The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings in which the figure is a diagrammatic representation of an embodiment of the invention.

Discussing now the figure in detail, it will be seen that the apparatus shown there comprises a base 1 on which there is arranged a fixed support member 2. This support member will be seen to be vertical in the embodiment shown and may consist of, or include three or more elongated bars of an electrically conductive material. The bars 3, which may be thought of as bus-bars, may for instance be made of brass. They are separated electrically by an insulating means 4 which is interposed between the respective bars. If desired, a separate weight-supportive structure may be provided in addition to the bars 3, and in that case the insulating means 4 also insulates the bars 3 from such separate supporting structure. The bus-bars 3 are connected to the secondary winding of a welding transformer 5 whose primary winding is indicated by reference numeral 15. Thus, the bus-bars 3 are electrically conductive along their entire length.

Mounted for movement along, that is up and down, the support 1 and 2 is a movable member which comprises a carriage 6 on which there is mounted a first moving means, such as a first motor 7, which will serve to promote vertical movement of the member 6 along the fixed support structure 2. Carried by the movable member 6 is a plurality of sliding contacts or brushes 8, one for each of the bus-bars 3. These brushes 8 are in turn connected with conductor means 9 which are in current-conducting relationship with electrode guides or nozzles 10 through which welding electrodes 11 are advanced to the actual welding station by suitable advancing means also carried by the movable member, but not identified or described because such means are well known and form no part of this invention.

A guide means 12, such as a second elongated support, is also carried by the movable member 6 and in turn supports the electrode guides 10 and the welding electrodes 11, as well as a slide 13 on which these elements are mounted for movement transversely of the elongation of the fixed member. The slide 13 further has mounted thereon a second motor 14 which serves to move the slide with the associated elements in such direction transversely of the elongation of the support member 2.

It will be obvious from a consideration of the drawing and the present specification that the movable member 6 can move to any point along the fixed support member 2 without losing electrical contact with the bus-bars 3, while at the same time not requiring the provision of connecting cables between the member 6 and the welding transformer 5, 15. By the same token, the slide 13 with the associated elements has a certain freedom of lateral movement, that is as much as the connecting conductors 9 will permit. Thus, the carriage 6 and the slide 13 can move vertically and transversely with respect to the welding transformer 5, 15 without having to drag with them heavy and cumbersome conductors. The motors 7, 14 may be much less strongly dimensioned than has been heretofore necessary, and will yet give reliable and accurate service.

Of course, if a particularly large arrangement of this type is to be constructed in accordance with the present invention, it is also possible to combine the bus-bars 3 in one vertical support means and to provide a second vertical support means adjacent to the first one simply for the purpose of carrying the movable member 6. This has already been indicated earlier and in this case the brushes or sliding contacts 8 will then extend from the carriage 6 on the one column into contact with the bus bars 3 forming the other column.

It will be understood that the inventive apparatus vastly simplifies the construction of such welding machines as described above, as well as their use and maintenance. At the same time it reduces the preparations for the actual welding process, saves considerably in material by eliminating the previously required large and heavy conductors, and reduces electrical losses to a minimum.

It will be understood that each of the elements described above, or two or more together, may also find a useful application in other types of electrical welding apparatus differing from the types described above.

While the invention has been illustrated and described as embodied in an electrical welding apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an electrical welding apparatus, elongated guide means comprising a support member and an upright column mounted thereon; carriage means mounted for movement with reference to said guide means; rigid first conductor means including a plurality of rigid first conductors secured and mounted on said column extending lengthwise thereof; a source of electrical energy connected to said first conductor means; second conductor means including a plurality of second conductors mounted on said carriage means and each including current take- off means in permanent current-conducting engagement with one of said first conductors of said first conductor means so that current will be transmitted between said conductor means in any position of said carriage means; and welding electrode means carried by said carriage means and including a plurality of welding electrodes each in electrical contact with one of said second conductors so as to receive electrical energy from said source through the intermediary of said first and second conductor means.

2. An apparatus as defined in claim 1, wherein said first conductor means comprises a plurality of bars of an electrically conductive material mounted on said guide means; and insulating means interposed between said bars and said column for precluding short-circuiting between adjacent bars and between said bars and said column.

3. An apparatus as defined in claim 2, said current take-off means comprising a plurality of current takeoffs mounted on said carriage and each of said current take-offs being in current-conductive engagement with a respective one of said bars.

4. An apparatus as defined in claim 3, wherein said source of electrical energy is a transformer located proximal to said guide means.

5. An apparatus as defined in claim 1, wherein said guide means further comprises at least one additional column having said carriage means mounted thereon for movement therealong, said columns being so arranged with respect to each other that current will be transmitted between said first conductor means on said upright column and said second conductor means on the carriage mounted on said additional column in any position of said carriage means relative to said upright column.

6. An apparatus as defined in claim 1, wherein said carriage means comprises a carriage mounted on said column for movement therealong and electrode holder means carried by said carriage.

7. An apparatus as defined in claim 6; and further comprising elongated support means secured to said carriage for movement therewith and extending normal to said column, said electrode holder means being mounted on said support means for sliding movement toward and away from said column.

8. Apparatus as defined in claim 7, said electrode means being carried by said electrode holder means.

9. An apparatus as defined in claim 7; and further comprising motor means on said carriage means for moving said carriage with respect to said column.

10. Apparatus as defined in claim 9; and further comprising motor means mounted on said carriage means for moving said carriage with respect to said column, and for moving said electrode holder means with respect to the carriage.

11. In an electrical welding apparatus, first elongated guide means comprising a support member and an upright column mounted thereon; carriage means mounted on said first guide means for movement therealong; first bus-bar conductor means extending lengthwise of said first guide means and secured thereto; a source of electrical energy connected to said first bus-bar conductor means; second elongated guide means extending transversely of said first guide means and carried by said carriage means thereon; electrode means mounted on said second guide means and slidable therealong for movement toward and away from said first guide means; and second conductor means in permanent current-conducting engagement with both said electrode means and said first bus-bar conductor means so that said electrode means will continue to receive current from said first bus-bar conductor means during relative displacement between said electrode means and said second guide means on the one hand and said carriage and said first guide means on the other.

(References on following page)

References Cited

UNITED STATES PATENTS

| | | | |
|---|---|---|---|
| 2,997,571 | 8/1961 | Smout | 219—126 |
| 3,128,368 | 4/1964 | Franz et al. | 219—125 |
| 3,135,856 | 6/1964 | Stone | 219—125 |
| 3,170,430 | 2/1965 | Bistak | 219—126 |
| 3,171,012 | 2/1965 | Morehead | 219—124 |
| 3,359,400 | 12/1967 | Denis et al. | 219—90 |

FOREIGN PATENTS 918,070    2/1963    Great Britain.

RICHARD M. WOOD, *Primary Examiner.*

W. DEXTER BROOKS, *Assistant Examiner.*

U.S. Cl. X.R.

219—88